United States Patent
Shin et al.

(10) Patent No.: US 9,873,334 B2
(45) Date of Patent: Jan. 23, 2018

(54) METHOD AND SYSTEM FOR VARIABLY ADJUSTING VOLTAGE OF LDC FOR HYBRID VEHICLE

(71) Applicants: Hyundai Motor Company, Seoul (KR); Kia Motors Corporation, Seoul (KR)

(72) Inventors: Dong Jun Shin, Gyeonggi-Do (KR); Yong Kak Choi, Seoul (KR); Soung Han Noh, Gyeonggi-Do (KR); Hwan Hwang, Gyeonggi-Do (KR); Jun Yeon Park, Gyeonggi-Do (KR); Chang Ryeol Ryu, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 307 days.

(21) Appl. No.: 14/860,956

(22) Filed: Sep. 22, 2015

(65) Prior Publication Data

US 2016/0121725 A1    May 5, 2016

(30) Foreign Application Priority Data

Nov. 5, 2014  (KR) .......................... 10-2014-0152617

(51) Int. Cl.
*B60L 11/10* (2006.01)
*B60L 7/16* (2006.01)

(52) U.S. Cl.
CPC ................. *B60L 7/16* (2013.01); *B60L 11/10* (2013.01); *Y02T 10/6221* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,783,872 A | * | 7/1998 | Blair | .................. B60L 11/1809 |
| | | | | 307/46 |
| 8,295,950 B1 | * | 10/2012 | Wordsworth | ...... B60H 1/00428 |
| | | | | 307/86 |

(Continued)

FOREIGN PATENT DOCUMENTS

| | | |
|---|---|---|
| JP | 2004-222474 A | 8/2004 |
| JP | 2010-226776 A | 10/2010 |

(Continued)

*Primary Examiner* — Thomas G Black
*Assistant Examiner* — Ana Thomas
(74) *Attorney, Agent, or Firm* — Mintz Levin Cohn Ferris Glovsky and Popeo, P.C.; Peter F. Corless (57) ABSTRACT

A method and system are provided for variably adjusted voltage of the LDC applied with an IBS (Intelligent Battery Sensor). The LDC output voltage control mode is determined in each of three driving modes, and the high electric loads are separated into two or more groups. The LDC output voltage value and the order priority are differentiated based on the durability of the auxiliary battery. Additionally, an LDC output voltage order table is generated according to the driving mode and the SOC state based on the auxiliary battery SOC information obtained from an IBS. Thus, consumed energy of the LDC and an energy consumption amount of the auxiliary battery are minimized, thus improving fuel efficiency.

11 Claims, 6 Drawing Sheets

(52) U.S. Cl.
CPC ........ *Y02T 10/7005* (2013.01); *Y02T 10/7077* (2013.01); *Y10S 903/903* (2013.01)

(56) References Cited

U.S. PATENT DOCUMENTS

| | | | |
|---|---|---|---|
| 2011/0025127 A1* | 2/2011 | Choi | B60K 6/48 307/10.1 |
| 2011/0049910 A1* | 3/2011 | Izumi | B60K 6/48 290/38 R |
| 2014/0028087 A1* | 1/2014 | Lee | B60R 16/02 307/9.1 |
| 2014/0244225 A1* | 8/2014 | Balasingam | G06F 17/5036 703/2 |
| 2017/0096078 A1* | 4/2017 | Shin | B60W 20/13 |

FOREIGN PATENT DOCUMENTS

| | | |
|---|---|---|
| KR | 10-2008-0111194 | 12/2008 |
| KR | 10-2011-0012214 | 1/2012 |
| KR | 10-2013-0116419 | 10/2013 |
| KR | 10-2014-0021218 | 2/2014 |
| KR | 10-1459485 B1 | 11/2014 |

* cited by examiner

FIG.1

RELATED ART

FIG.2

| Mode type | Energy flow | Efficiency calculation |
|---|---|---|
| EV mode<br><br>Motor Power > threshold | $\eta E$ Engine ⇢ $\eta M$ Motor ← $\eta B$ Battery → LDC → Vehicle; Motor → Wheel; LDC → 12V Batt ($\eta L$) | ■ $\eta E \times \eta M \times \eta B_{chg} \times \eta B_{dch} \times \eta L$<br>= 30%×90%×95%×95%×90%<br>= 22% |
| Engine charge mode while driving<br><br>Motor Power > threshold<br>&<br>Fuel Injection = 1 | $\eta E$ Engine → $\eta M$ Motor → $\eta B$ Battery; Motor → LDC → Vehicle; Motor → Wheel; LDC → 12V Batt ($\eta L$) | ■ $\eta E \times \eta M \times \eta L$<br>= 30%×90%×90%<br>= 24% |
| Regenerative braking mode<br><br>Motor Power > threshold<br>&<br>Fuel Injection = 0 | $\eta E$ Engine — $\eta M$ Motor → $\eta B$ Battery; Motor → LDC → Vehicle; Wheel → Motor; LDC → 12V Batt ($\eta L$) | ■ $\eta M \times \eta L$<br>= 90%×90%<br>= 81% |

METHOD AND SYSTEM FOR VARIABLY ADJUSTING VOLTAGE OF LDC FOR HYBRID VEHICLE

CROSS-REFERENCE TO RELATED APPLICATION

This application claims under 35 U.S.C. § 119(a) the benefit of Korean Patent Application No. 10-2014-0152617 filed on Nov. 5, 2014, the entire contents of which are incorporated herein by reference.

BACKGROUND (a) Technical Field

The present invention relates to a method and system for variably adjusting output voltage of a LDC for a hybrid vehicle, and more particularly, to a method and system for variably adjusting voltage of the LDC by applying an intelligent battery system (IBS) to the hybrid vehicle.

(b) Background Art

In general, a low voltage direct current-direct current (DC-DC) converter (LDC) is a device that switches direct current to be converted into alternating current (AC), increases or decreases the alternating current using coils, transformers, capacitors, etc., and rectifies the increased or decreased alternating current to be converted into the direct current again. The LDC installed within the hybrid vehicle is configured to convert high DC voltage from the high voltage battery to low DC voltage to charge an auxiliary battery, and monitor the amount of electric loads of the hybrid vehicle to supply electricity to suit voltage used in each electric load.

A voltage control method of the LDC in the related art is based on a driving mode of the hybrid vehicle and a temperature around the auxiliary battery without detecting a charged status of the auxiliary battery. Thus, the charge efficiency of the auxiliary battery decreases and a fuel efficiency effect may be difficult to improve. The voltage control method of the LDC in the related art will be described hereinafter.

Figure 1:
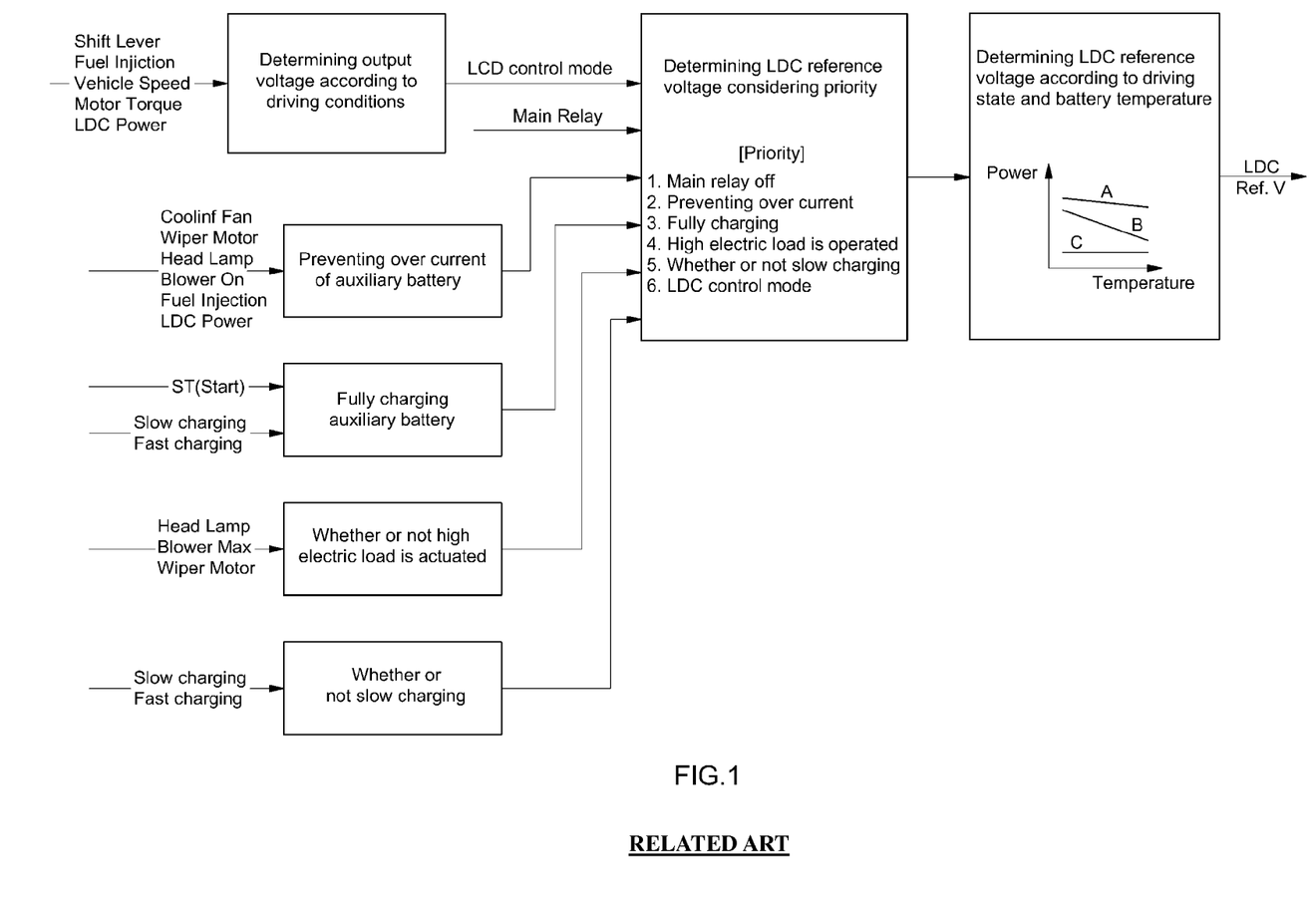
FIG. 1 a control flowchart illustrating a voltage control flow of an LDC according to the related art.

FIG. 1 illustrates a voltage control flow of an LDC according to the related art. In voltage control of the LDC, a higher (e.g., an upper or dominate) controller, i.e., a hybrid control unit (HCU) transmits a voltage order to a lower controller (e.g., a subordinate), i.e., the LDC. In particular, the higher controller is configured to determine a control priority based on durability of the auxiliary battery and a degrading driving performance caused by use of high electric loads. Thereafter, when the voltage control of the LDC is normally accomplished, a LDC voltage control mode is determined based on various driving statuses such as a gear lever position, a fuel injection status, a vehicle speed, a motor torque, LDC power consumption, and so forth.

As listed in Table 1 below, the LDC voltage control mode is determined for each driving condition of maximum 7 driving conditions (e.g., a vehicle stop state, a deceleration period, an EV mode, an idle state, HEV mode, parking (P) stage, and a rear (R) driving state) based on the gear lever position, the fuel injection status, the vehicle speed, the motor torque, the LDC power consumption, and so forth.

TABLE 1

| | | Vehicle driving condition | | |
|---|---|---|---|---|
| Gear Position | Fuel Injection | Vehicle speed, 2 kph or more | Motor torque, 5 Nm or more | Vehicle state |
| — | X | X | — | Vehicle stop state |
| — | X | ◯ | X | Deceleration period |
| — | X | ◯ | ◯ | EV mode |
| — | ◯ | X | — | Idle state |
| — | ◯ | ◯ | — | HEV mode |
| P | — | — | — | P stage parking |
| R | — | — | — | Rear driving state |

Therefore, reference voltage order values which are mapped according to the LDC output voltage control modes determined for each of 7 driving modes is output from the LDC based on the temperature surrounding the auxiliary battery and the current power consumption amount of the LDC.

However, since the LDC output voltage control mode is subdivided into 7 driving modes, frequent changes of LDC output voltage order occur as the driving mode changes. As a result, the lifespan of the LDC may decrease and durability of the LDC may be degraded. In particular, during the LDC output voltage control mode, the LDC output voltage order may be alternately controlled to increase and decrease based on the change of the driving mode without detecting the charge status of the auxiliary battery, thus causing ineffective influence on the fuel efficiency such as increased consumed energy of the LDC.

The above information disclosed in this section is merely for enhancement of understanding of the background of the invention and therefore it may include information that does not form the related art that is already known in this country to a person of ordinary skill in the art.

SUMMARY

The present invention provides a method and system for variably adjusting voltage of an LDC for a hybrid vehicle in which in the related art, the LDC voltage control mode was determined for seven different driving conditions. In the claimed invention, the LDC output voltage control mode may be determined in each of primary three driving modes, an output value of the LDC output voltage is as the same output order value without considering the types of the high electric loads in the related art, while the high electric loads may be separated into two or more groups and the LDC output voltage value and the order priority may be differentiated based on the durability of the auxiliary battery, (i.e. limiting the over charge and over discharge of the auxiliary battery) and a LDC output voltage order table may be generated according to the driving mode and the state of charge (SOC) based on the auxiliary battery SOC information obtained from an Intelligent Battery Sensor (IBS), as a result, the LDC power consumption and the auxiliary battery power consumption are minimized, thereby by improving fuel efficiency.

In one aspect, the present invention provides a method for variably adjusting voltage of an LDC for a hybrid vehicle and may include: determining an LDC output voltage control mode for each of three driving modes including an EV mode, an engine charge mode, and a regenerative braking mode; separating high electric loads into two or more groups and determining LDC output voltage based on a voltage consumption amount of each of the groups; and variably adjusting the LDC output voltage by generating a LDC output voltage order table based on temperature information of the auxiliary battery and SOC information sensed by an IBS mounted on a terminal of the auxiliary battery.

In an exemplary embodiment, the three driving modes including the EV mode, the engine charge mode, and the regenerative braking mode may be determined based on a gear lever position, existence of fuel injection, a vehicle speed, power of a motor, and an engagement amount of an accelerator pedal. Additionally, the LDC reference voltage for charging the auxiliary battery may be determined for each of the three driving modes. Further, the priority of the LDC output voltage may be determined for each of loads requiring high voltage and loads requiring low voltage. In particular, the loads requiring the high voltage may include a blower at a maximum stage and a cooling fan in a high stage; and the loads requiring the low voltage may include a headlamp, a wiper, and a rear defogger.

In another exemplary embodiment, when the loads requiring the high voltage and the loads requiring the low voltage are actuated simultaneously, the LDC may be configured to output an output voltage suitable for the loads requiring the high voltage with priority. Further, the SOC information of the auxiliary battery sensed by the IBS may be separated into three stages (e.g., low, normal, and high) and transition among the respective stages may be based on a hysteresis.

The present invention may have the following advantages:

First, the LDC voltage control mode was determined in each of maximum seven driving conditions in the related art, however, in the claimed invention the LDC output voltage control mode may be determined in each of primary three driving modes. Thereafter, LDC reference voltage suitable for each driving mode may be output, to minimize frequent changes of LDC output voltage order based on driving mode changes in the related art. As a result, durability of auxiliary battery and durability of the LDC may be improved, thereby improving fuel efficiency.

Second, the LDC output voltage is output as the same order value without considering the types of the high electric loads in the related art, while in the claimed invention, the high electric loads are separated into two or more groups and the LDC output voltage value and the order priority are differentiated, thus improving the durability of the auxiliary battery and the fuel efficiency.

Third, an LDC output voltage order table may be generated according to the driving mode and the SOC state of the auxiliary battery based on the auxiliary battery SOC information sensed by the IBS. As a result, the consumed energy of the LDC and an energy consumption amount of the auxiliary battery power consumption may be minimized, thereby improving fuel efficiency.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

For understanding the present invention, among the terms used in the present specification, a LDC and Low Voltage DC-DC converter that have the same meaning are interchangeably used.

The present invention includes a method and system for variably adjusting voltage of an LDC for a hybrid vehicle. The method may be executed by a controller having a memory and a processor. In particular, the method includes determining a LDC reference voltage to charge an auxiliary battery for each minimized driving mode by minimizing consumed energy of the LDC and an energy consumption amount of an auxiliary battery power to enable fuel efficiency improvement; separating high electric loads into two or more groups and determining a LDC output voltage based on a voltage consumption amount for each of the groups; and variably adjusting the LDC output voltage by generating a LDC output voltage order table based on SOC information sensed by an IBS mounted on a terminal of the auxiliary battery in addition to temperature information of the auxiliary battery.

The determination of the LDC reference voltage to charge the auxiliary battery for each of the minimized driving modes may be executed by an upper controller, (e.g., hybrid control unit (HCU) of the hybrid vehicle) and may be configured to determine the three driving modes including an EV mode, an engine charge mode, and a regenerative braking mode based on a gear lever position, a fuel injection existence, a vehicle speed, motor power, and an acceleration pedal engagement amount; and determine the LDC reference voltage to charge the auxiliary battery for each of the three driving modes.

In other words, in the related art, the LDC voltage control mode was determined in each of maximum seven driving conditions, however, in the claimed invention, the LDC output voltage control mode may be determined in each of primary three driving modes including an EV mode, an engine charge mode, and a regenerative braking mode. Thereafter, LDC reference voltage suitable for each driving mode may be output, thus minimizing frequent changes of LDC output voltage order according to driving mode changes as caused in the related art. As a result, durability of auxiliary battery and durability of the LDC may be improved as well as fuel efficiency.

Figure 2:
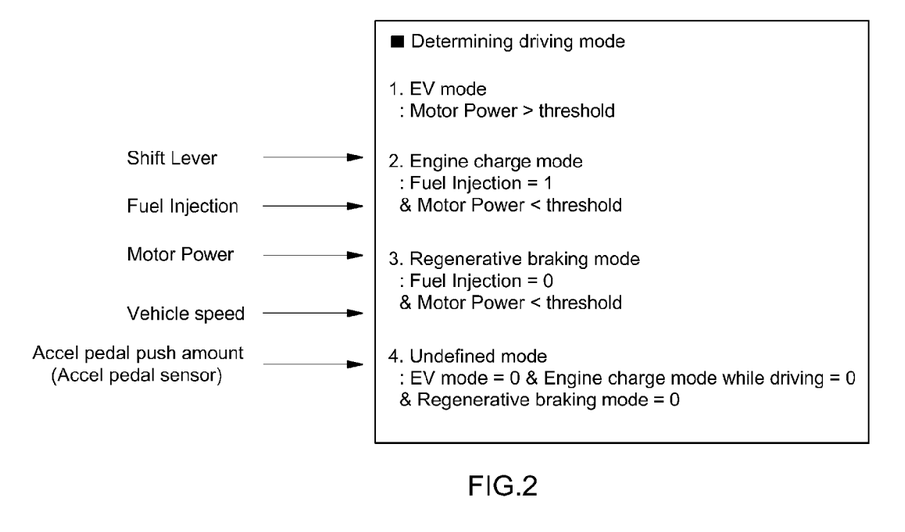
FIGS. 2 and 3 are diagrams illustrating driving modes for variably controlling voltage of an LDC for a hybrid vehicle and an energy flow path for each of the driving modes according to an exemplary embodiment of the present invention.

Herein, referring to FIG. 2 to FIG. 4, the process of determining the LDC output voltage control mode in each of the three driving modes including the EV mode, the engine charge mode, and the regenerative braking mode will be described hereinafter. The engine charge mode may be determined when both fuel injection is detected and electric motor power satisfies a charging hysteresis (i.e., when both fuel is injected and the electric motor power is a threshold value or less). In this engine charge mode, the LDC voltage control mode may be an auxiliary battery charging mode.

Figure 3:
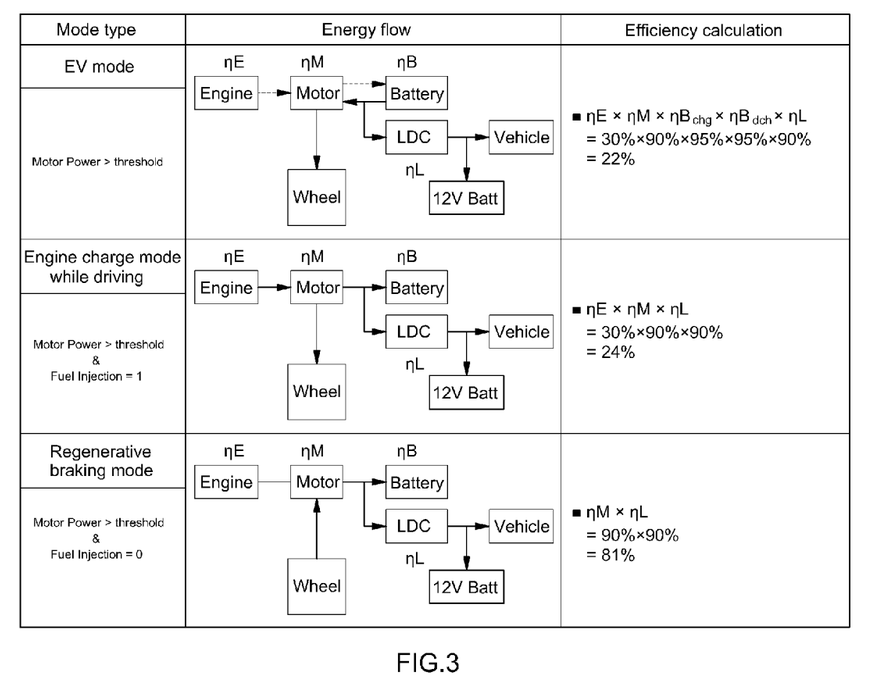
Figure 4:
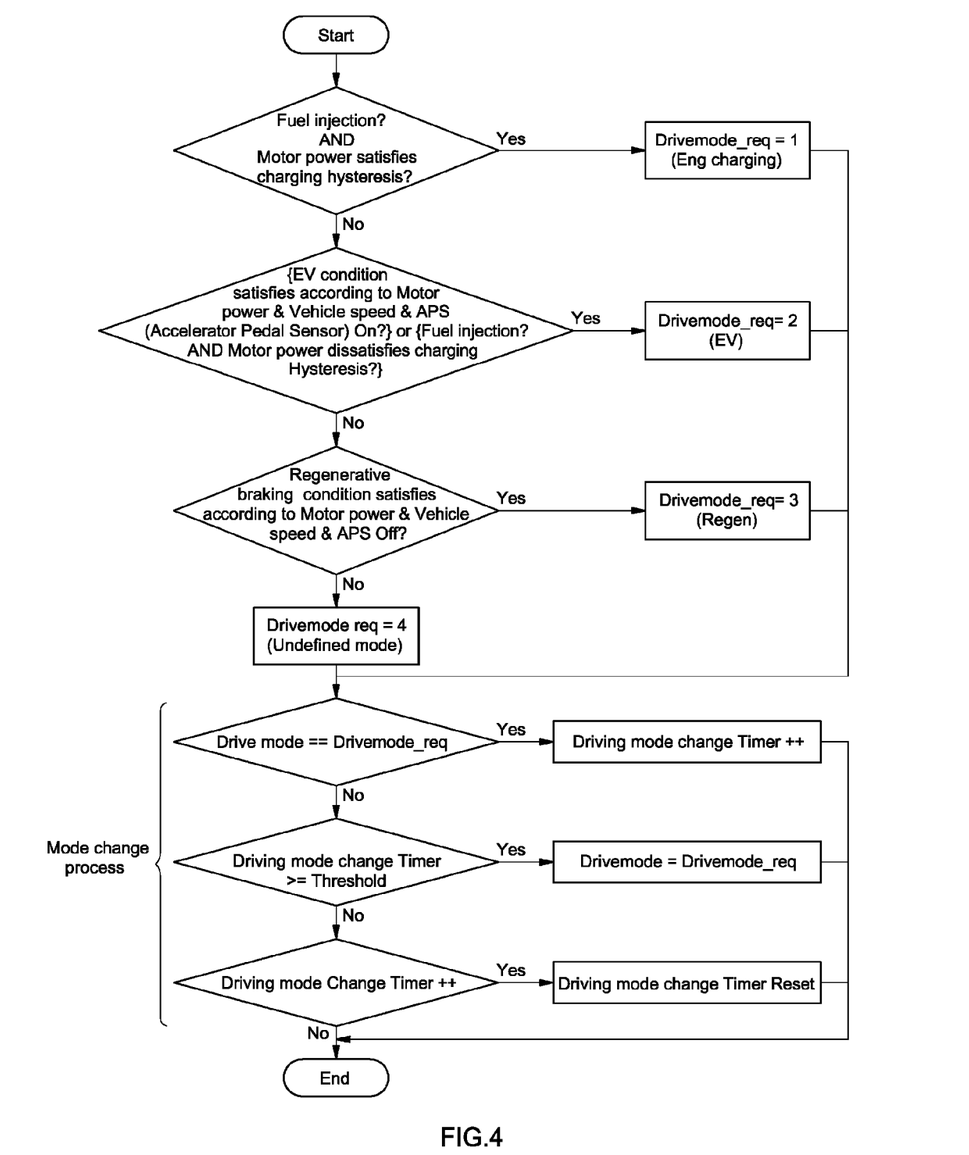
FIG. 4 is a flowchart illustrating a process for determining the driving modes as the method for variably controlling voltage of an LDC for a vehicle according to an exemplary embodiment of the present invention.

In particular, since the auxiliary battery charging voltage control may be performed during the engine charge mode, as illustrated in FIG. 3, the efficiency of an auxiliary battery charging pathway during the engine charge mode may be less than that of the auxiliary battery charging pathway during the regenerative braking mode, resulting in low auxiliary battery charging efficiency.

The EV mode may be determined when both fuel injection is not detected and electric motor power does not satisfy a charging hysteresis, (e.g., when both fuel injection is not detected and the electric motor power is the threshold value or greater) or when the motor power and vehicle speed satisfy a driving mode entering condition while an acceleration pedal sensor is on. In the EV mode, the auxiliary battery charging is not performed from the electric motor or engine, but from high voltage battery power by the LDC voltage control.

The regenerative braking mode may be determined when the motor power and vehicle speed satisfy a regenerative braking mode entering condition while the acceleration pedal sensor is off. The efficiency of the auxiliary battery charging pathway during the regenerative braking mode may be improved substantially. Therefore, regenerative braking mode is suitable for auxiliary battery charging. Thus, during the regenerative braking mode, the auxiliary battery charging may be performed by the LDC. Meanwhile, as illustrated in FIG. 3, in a default mode in which the EV mode, the engine charge mode, and the regenerative braking mode may not be determined, a transition process to each driving mode may be subsequently performed within a set period of time based on a driving mode request.

As described above, in the related art, the LDC voltage control mode was determined in each of maximum seven driving conditions and in the claimed invention, the LDC output voltage control mode, that is, the LDC charge control mode for the auxiliary battery may be determined in each of primary three driving modes including an EV mode, an engine charge mode, and a regenerative braking mode. Thereafter, LDC reference voltage suitable for each driving mode may be output, thus minimizing frequent changes of LDC output voltage order according to driving mode changes as seen in the related art. As a result, durability of auxiliary battery and durability of the LDC may be improved as well as fuel efficiency.

Herein, among the methods of variably adjusting the LDC voltage for the hybrid vehicle according to an exemplary embodiment of the present invention, a process for determining the LDC output voltage based on voltage consumption for each group, by separating high electric loads into two or more groups, will be described hereinafter.

Figure 5:
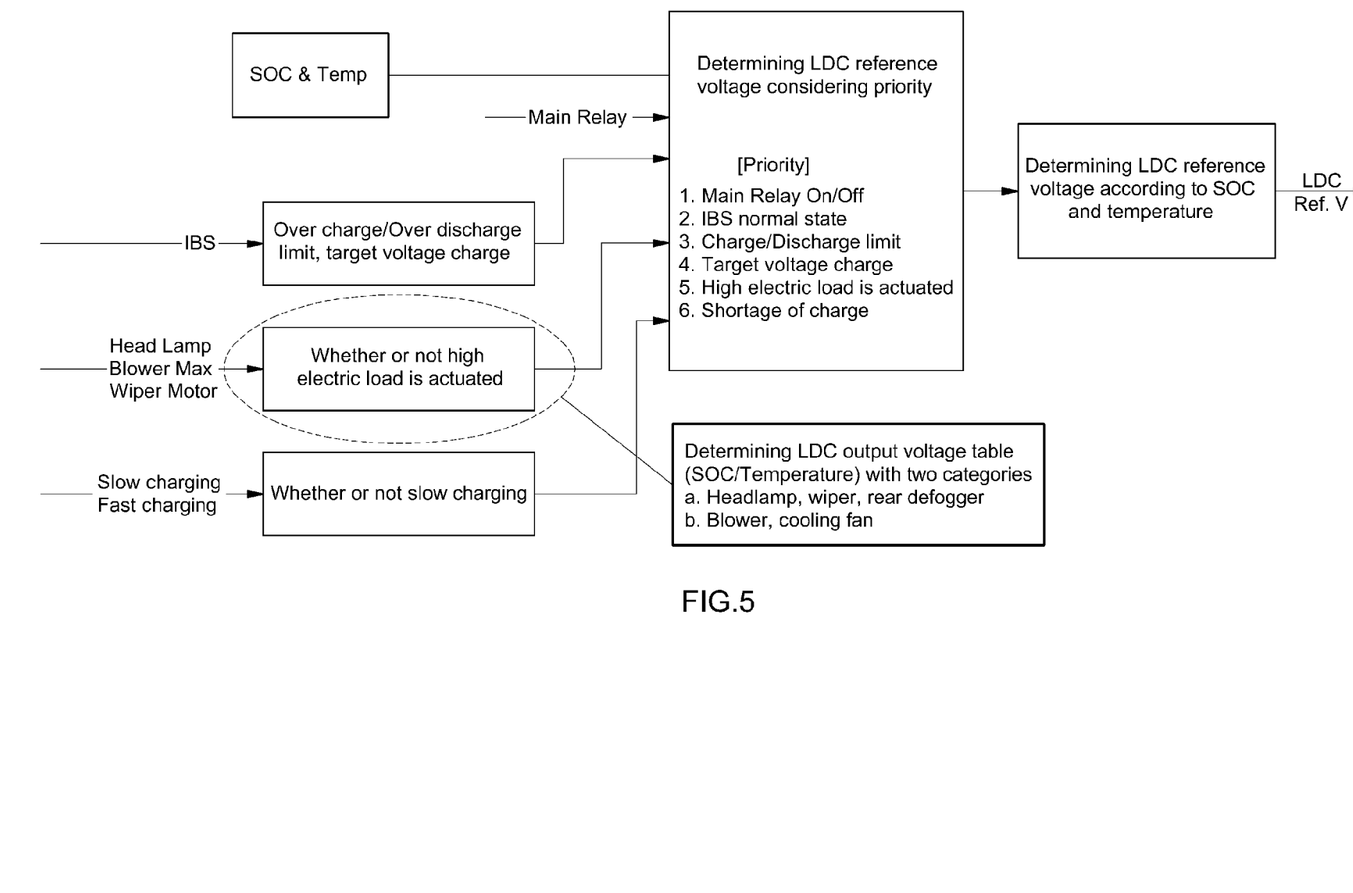
FIG. 5 is a control flowchart illustrating a process of determining LDC output voltage by separating high electric loads into two or more groups as the method for variably controlling voltage of an LDC for a vehicle according to an exemplary embodiment of the present invention.

Referring to FIG. 5, the LDC may be configured to perform a voltage control of discharging the auxiliary battery by determining whether the high electric load is actuated. In the related art, the LDC performs a control of supplying voltage from the auxiliary battery to the high electric loads without considering the types of high electric loads. Therefore, in the related art high output voltage is applied even to the high electric loads requiring low voltage, thus consuming more energy from the auxiliary battery. As a result, fuel efficiency is reduced since the fuel is required to drive a motor or en engine to charge the auxiliary battery later.

However, according to an exemplary embodiment of the present invention, the LDC voltage control may be performed to discharge the auxiliary battery by determining whether the high electric load is actuated. The LDC output voltage priority of the high electric loads may be determined based on a load requiring high voltage and a load requiring low voltage. The load requiring the high voltage may include a blower in a max stage, a cooling fan in a high mode, and the like, and the load requiring the low voltage may include a headlamp, a wiper, rear defogger, and the like. For each load categorized into the required voltage thereof, an LDC output voltage value and the priority thereof may be determined.

In the related art, 14 V is output from the auxiliary battery by LDC voltage control without considering the types of loads. In the present invention, about 12.5 V may be output from the auxiliary battery by LDC voltage control when the required voltage of the head lamp is a relative low voltage, thus reducing a charging amount of the auxiliary battery and improving the fuel efficiency.

In particular, when the load requiring the high voltage and the load requiring the low voltage are actuated together, the LDC may be configured to output output voltage suitable for the load requiring the high voltage. For example, when the blower in max stage requiring high voltage and the headlamp requiring low voltage are operated together, an output voltage that corresponds to the blower in max stage requiring high voltage may be output from the auxiliary battery by the LDC voltage control to satisfy the operational performances of both the blower in max stage and the headlamp.

Herein, among the methods of variably adjusting the LDC voltage for the hybrid vehicle according to an exemplary embodiment of the present invention, an LDC output voltage order table may be generated based on the SOC information of the auxiliary battery in addition to the temperature information of the auxiliary battery, through which variably adjusting the LDC voltage may be accomplished for each driving mode. Accordingly, an IBS, a type of battery sensor, may be installed at a terminal of the auxiliary battery. Information sensed from the IBS, (e.g., SOC information of the auxiliary battery) may be transferred to a HCU, an upper controller. The HCU may be configured to generate an order table of the LDC output voltage based on the temperature and the SOC information of the auxiliary battery.

In particular, the SOC information of the auxiliary battery sensed by the IBS may be categorized into three stages (e.g., low, normal, and high). The transition among the respective stages is based on a hysteresis. Then, the order table of the LDC output voltage based on the SOC information and the temperature information of the auxiliary battery for variably adjusting the LDC output voltage may be generated. The order table of the LDC output voltage may be a two dimensional type with input values from the temperature and the SOC information of the auxiliary battery.

Figure 6:
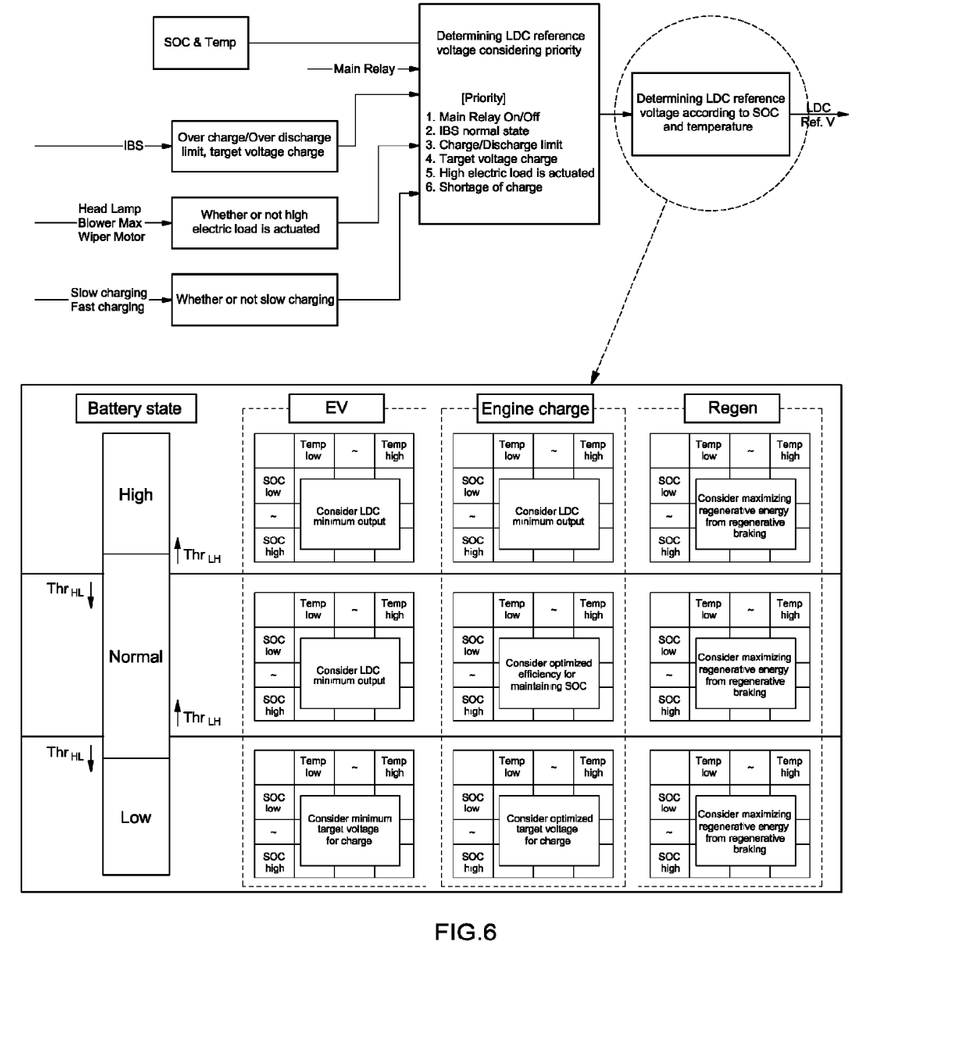
FIG. 6 is a control diagram illustrating an LDC voltage control example using battery information from an IBS as the method for variably controlling voltage of an LDC for a vehicle according to an exemplary embodiment of the present invention; and It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

A reference voltage for charging and discharging the LDC may be determined by referencing the order table of the LDC output voltage, as illustrated in FIG. 6. For example, as illustrated in FIG. 6, when the auxiliary battery SOC information exhibits high, a lowest voltage output control of the LDC may be considered to minimize the charge amount of the auxiliary battery during the EV mode and the engine charge mode. When the auxiliary battery SOC information exhibits low, the voltage control of the LDC for charging the auxiliary battery may be considered to minimize the charge amount of the auxiliary battery during the EV mode and the engine charge mode. During the regenerative braking mode, the LDC voltage control for maximizing regenerative energy may be considered. In other words, by receiving the IBS information, it may be possible to build a differentiated strategy of variably adjusting the LDC voltage.

As described above, the LDC output voltage control mode for each of three driving modes may be determined, the high electric load may be separated into two or more groups to differentiate the LDC output voltage value and the order sequence, and the LDC output voltage order table may be generated based on the auxiliary battery SOC status.

What is claimed is:

1. A method for variably adjusting voltage of a low voltage direct current-direct current converter (LDC) for a hybrid vehicle, the method comprising:
   determining, by a controller, an LDC output voltage control mode for each three driving modes including an electric vehicle (EV) mode, an engine charge mode, and a regenerative braking mode;
   separating, by the controller, high electric loads into two or more groups and determining LDC output voltage based on a voltage consumption amount of each of the groups; and
   variably adjusting, by the controller, the LDC output voltage by generating a LDC output voltage order table based on temperature information of the auxiliary battery and state of charge (SOC) information sensed by an intelligent battery sensor (IBS) mounted on a terminal of the auxiliary battery.

2. The method of claim 1, wherein the three driving modes are determined based on a gear lever position, existence of fuel injection, a vehicle speed, power of a motor, and an engagement amount of an accelerator pedal, and a LDC reference output voltage for charging the auxiliary battery is determined for each of the three driving modes.

3. The method of claim 1, wherein a priority of the LDC output voltage is determined for each of loads requiring high voltage and loads requiring low voltage.

4. The method of claim 3, wherein the loads requiring the high voltage include a blower in a maximum stage and a cooling fan in a high stage; and the loads requiring the low voltage include a headlamp, a wiper, and a rear defogger.

5. The method of claim 3, wherein, when the loads requiring the high voltage and the loads requiring the low voltage are actuated simultaneously, the LDC is configured to output an output voltage suitable for the loads requiring the high voltage with priority.

6. The method of claim 1, wherein the SOC information of the auxiliary battery sensed by the IBS is separated into three stages and transition among the respective stages is based on a hysteresis.

7. A system for variably adjusting voltage of a low voltage direct current-direct current converter (LDC) for a hybrid vehicle, the system comprising:
   a memory configured to store program instructions; and
   a processor configured to execute the program instructions, the program instructions when executed configured to:
   determine an LDC output voltage control mode for each three driving modes including an electric vehicle (EV) mode, an engine charge mode, and a regenerative braking mode;
   determine high electric loads into two or more groups and determining LDC output voltage based on a voltage consumption amount of each of the groups; and
   variably adjust the LDC output voltage by generating a LDC output voltage order table based on temperature information of the auxiliary battery and state of charge (SOC) information sensed by an intelligent battery sensor (IBS) mounted on a terminal of the auxiliary battery.

8. The system of claim 7, wherein the three driving modes are determined based on a gear lever position, existence of fuel injection, a vehicle speed, power of a motor, and an engagement amount of an accelerator pedal, and a LDC reference output voltage for charging the auxiliary battery is determined for each of the three driving modes.

9. The system of claim 7, wherein a priority of the LDC output voltage is determined for each of loads requiring high voltage and loads requiring low voltage.

10. The system of claim 9, wherein the loads requiring the high voltage include a blower in a maximum stage and a cooling fan in a high stage; and the loads requiring the low voltage include a headlamp, a wiper, and a rear defogger.

11. The system of claim 7, wherein the SOC information of the auxiliary battery sensed by the IBS is separated into three stages and transition among the respective stages is based on a hysteresis.

* * * * *